INVENTOR.
Solomon Manber
BY
[signature]
ATTORNEY

HORIZONTAL DEFLECTION CONTROL HDC

VERTICAL DEFLECTION CONTROL VDC

United States Patent Office 3,562,718

Patented Feb. 9, 1971

3,562,718

PATTERN GENERATOR WITH FEEDBACK

Solomon Manber, Sands Point, N.Y., assignor to Alphanumeric, Incorporated, Lake Success, N.Y., a corporation of Delaware Filed Aug. 8, 1968, Ser. No. 751,232
Int. Cl. G06f *3/14*
U.S. Cl. 340—172.5 16 Claims

ABSTRACT OF THE DISCLOSURE

Apparatus for generating patterns on a receiving medium comprises a beam source assembly wherein the patterns to be generated are "painted" as combinations of successive strokes by the beam. The beam from each stroke is split to follow two paths, one toward the receiving medium and the other toward a transducer assembly, which generates signals as the beam moves over it. These signals, which effectively indicate the instantaneous position of the beam, are compared with coded combinations of signals specifying the desired terminal positions of the beam to generate control signals which control the deflection of the beam which control the deflection of the electron beam of the cathode ray tube. Further means are shown wherein the light directed toward the record can be selectively exposed.

This invention pertains to pattern generators and more particularly to pattern generators which employ feedback to control precisely the position and shape of the patterns on a medium.

Pattern generators are used in many fields. One major field concerns visual displays such as cathode ray tube output terminals used in remote data communication terminals, stock quote boards, airline schedule displays, etc. This field generally does not require good resolution or highly precise character patterns. Another field concerns visual radar displays used by air traffic controllers. Such displays must encompass large areas with high resolutions and precise positioning of the patterns on the display screen.

A field requiring the utmost resolution and precise positioning of the patterns is the photocomposition technology. Photocomposition requires the generation of graphic arts quality characters or symbols for recording on a film which becomes the negative or master in a printing operation. The character generators that are employed must have resolutions in the order of a thousandth of an inch (a mil). In addition, the placement of the character and its linear dimensions must fall within a similar tolerance.

In order to satisfy these requirements, pattern generators following the teachings of U.S. Pat. No. 3,305,841 and in my copending application Ser. No. 572,609, filed Aug. 15, 1966, for a Pattern Generator have been built. These pattern generators have solved the problem of precisely defining the shape, dimensions and positioning of the symbols with a minimum amount of coded information.

While these pattern generators have been highly successful, they require complex circuitry and techniques to maintain the required tolerances. Accordingly, there has been a demand for even better and more simplified pattern generators wherein the required tolerances are maintained.

For example, the above-cited pattern generators employ cathode ray tube displays wherein the characters are formed by adjacent parallel strokes of varying lengths. The width and the length of each stroke must be controlled to within the order of a mil. Such a requirement requires the use of very expensive cathode ray tube and yoke assemblages and their associated deflection circuits. Such systems also require exacting alignment procedures and calibrations. In addition, complex circuitry must be included in the deflection circuits to correct for pin cushion distortion in the cathode ray tube.

It is accordingly a general object of the invention to provide an improved pattern generator.

It is another object of the invention to provide a pattern generator, which presents patterns to a display or record medium with hitherto unobtainable resolution, dimensional and orientational precision.

It is a further object of the invention to provide an improved pattern generator utilizing a cathode ray tube assemblage, which requires simpler and fewer components to generate the analog signals, which are used to deflect the electrode beam in the painting of the patterns.

It is another object of the invention to provide a pattern generator utilizing a cathode ray tube assemblage that requires no fine alignment or calibration procedures, accordingly, fewer and less expensive components can be used.

It is still a further object of the invention to provide such a pattern generator which requires no built-in extra circuitry to compensate for pin cushion distortion associated with cathode ray tubes.

According to one aspect of the invention, there is contemplated apparatus for presenting a pattern to a medium such as a record or display medium. The apparatus includes means for generating a source beam, which can change the state of the regions of the medium upon which the beam impinges. For example, the source beam may be a beam of light impinging on a photographic film. Means responsive to control signals direct the source beam to move in particular directions. Means generate first indicia, such as coded combinations of signals related to the directions it is desired to move the source beam; and transducer means generate second indicia, such as coded combinations of signals in response to a beam moving over regions thereof. Means are provided for splitting the source beam so that a first portion thereof can impinge on the medium and a second portion thereof can move over the transducer means. Means compare the first and second indicia to generate the control signals to move the source beam in directions related to particular instantaneous relationships of the first and second indicia. Thus, it is seen that a feedback system is used, which precisely controls the positioning and travel of the source beam.

A feature of this aspect of the invention is the provision of means for controllably rotating the transducer means so that the patterns presented to the medium can be rotated.

Another aspect of the invention is concerned with expanding the lateral extent of coverage of the medium, which can be scanned by the beam.

Other objects, features and advantages of the invention will be apparent from the following detailed description when read with the accompanying drawing which shows, by way of example and not limitation, pattern generator apparatus for practicing the invention. In the drawings.

Figure 1:
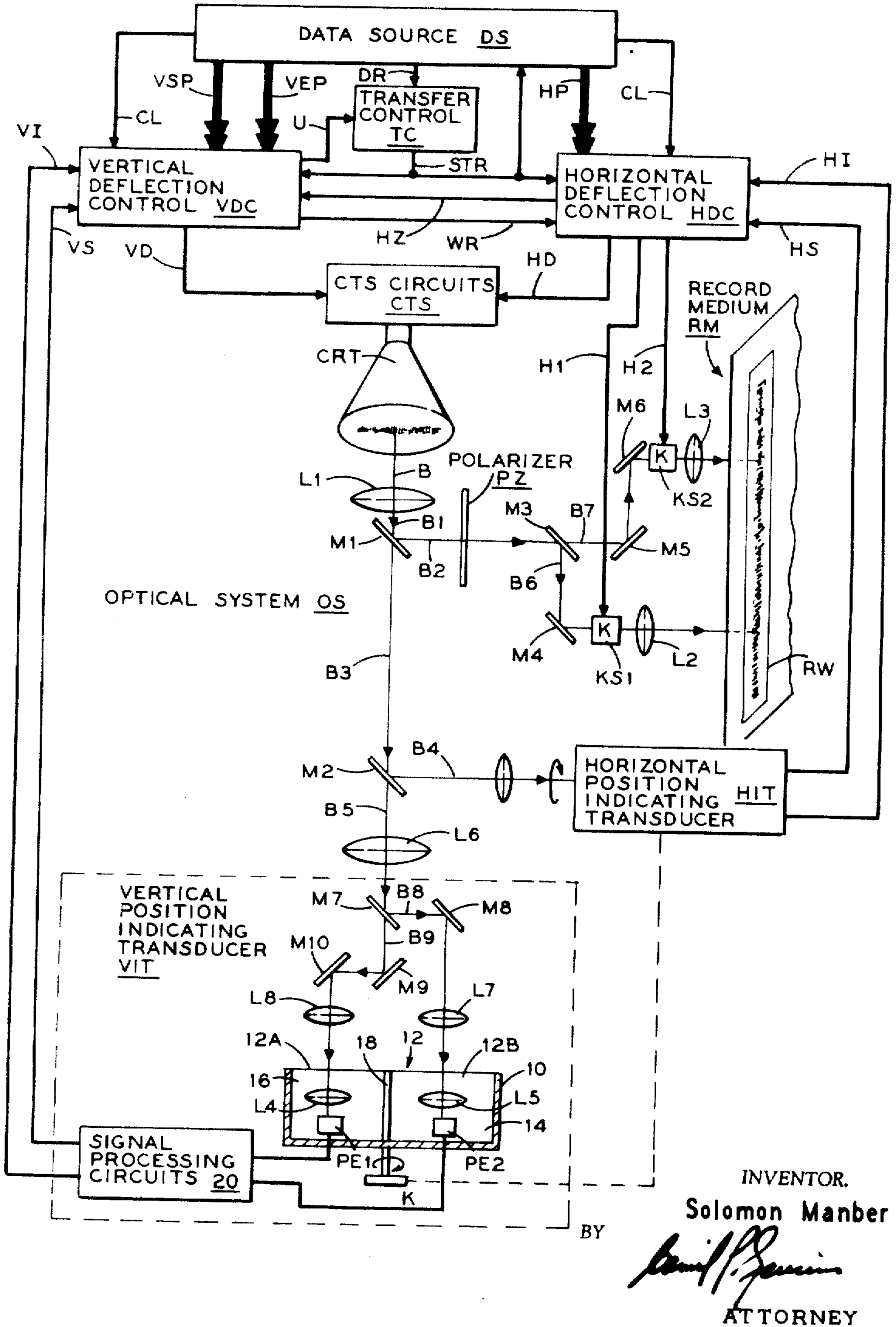
FIG. 1 shows a pattern generator employing a cathode ray tube, partially in block diagram and partially in schematic representation, in accordance with the invention.

In FIG. 1, the pattern presentation system shown is a pattern generator comprising a cathode ray tube (CRT)

upon whose screen is generated patterns in responses to signals received from the vertical deflection control (VDC) and the horizontal deflection control (HDC) which are partially controlled from pattern data source (DS). The pattern on the screen of cathode ray tube (CRT) is focussed via optical system (OS) onto record medium (RM), and onto vertical position indicating transducer (VIT) and horizontal position indicating transducer (HIT).

Before proceeding with the details, it will be worthwhile to discuss the generation of patterns. The area of the record medium (RM) which is exposed for recording at any one time is a rectangular region designated by the region (RW). This region, called a recording window, is defined by an aperture plate (not shown) interposed between the record medium (RM) and the optical system (OS). The recording window can be divided into a coordinate system grid, wherein the horizontal axis of the coordinate system is parallel to the long dimension of the window (called the horizontal dimension) and the vertical axis is parallel to the short dimension of the window (called the vertical dimension). By way of example, the grid can have 16,384 horizontal coordinates and 256 vertical coordinates. These values are merely an example and are in no sense limiting and are convenient values to simplify the description. In such a case, the center of the second window is the horizontal coordinate H8192 and the vertical coordinate V 128.

Now it should be apparent that the record window (RW) is the image of a particular rectangular area of the screen (face) of the cathode ray tube (CRT). The tube area is preferably divided by two orthogonal diameters of the screen. Hence, there can be considered a coordinate system of the screen of the cathode ray tube which is in one-to-one relationship with the coordinate system of the record window. Now, it is also known that each point on the screen of the cathode ray tube is also related to a combination of the amplitude of a horizontal deflection signal and the amplitude of a vertical deflection signal. Now, these signal amplitudes can be represented by numbers. Hence, by specifying a pair of numbers, the electron beam of the cathode ray tube can be directed to a particular point on the screen. Therefore, the patterns to be generated can be coded up into groups of numbers and signals representing these numbers used to deflect the electron beams which "paints" the pattern.

Figure 2:
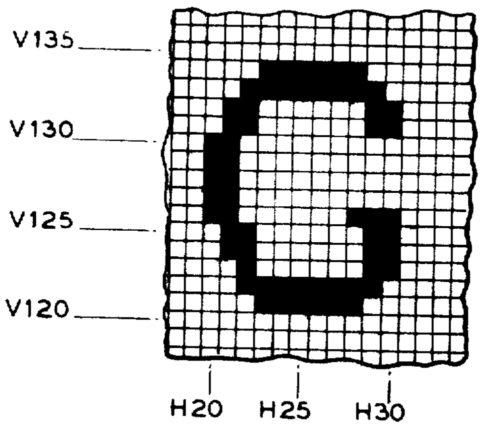
FIG. 2 shows a portion of a typical pattern to be presented to a record medium.

FIG. 2 shows a representative pattern to be recorded. Actually, it is a particular alphabetic character in a line of alphabetic characters which are to be recorded on the record medium (RM). The grid behind the character can be considered to be a portion of the record window coordinate system and the coordinate values shown are the actual values on the record window grid.

Now the character can be painted by the following routine:

(1) Move the electron beam to coordinates H 20, V 130, with the record medium blocked from the corresponding light beam;

(2) Move the electron beam to H 20, V 126 with the record medium exposed to the light beam;

(3) Move the electron beam to H 21, V 124 with the light beam blocked;

(4) Move the electron beam to H 21, V 132 with the record medium exposed to the light beam; etc.

Thus, it is seen that each painted stroke or column segment can be defined by three numbers:

(a) a number representing the horizontal coordinate of the stroke, hereinafter designated the HP value;

(b) a number representing the vertical coordinate where the light beam is "turned on," hereinafter designated the VSP value; and (c) a number representing the vertical coordinate where the light beam is "turned off," hereinafter designated the VEP value.

In other words, each pattern can be coded as a plurality of triods of values (HP, VSP, VEP). While the above-described character coding scheme will be employed in the description of the apparatus, other coding schemes, such as those disclosed in the above-cited patents can equally be used.

Before returning to FIG. 1, the following convention will be noted, heavy double arrow headed signal lines indicate cables of a plurality of lines. The data source (DS) which can be a digital computer system stores the coded representations of the characters and is programmed to transmit them sequentially in the proper sequence. More particularly, the HP number can be represented as a 16-bit binary number, while each of the VSP and VEP numbers can be represented by an 8-bit binary number. While transfer of binary numbers will be mentioned, it should be realized that what is actually implied is binary coded combinations of signals representing the binary numbers. The data source (DS) has a 32-bit I/O channel and a typical control device associated therewith. Whenever the I/O channel is loaded and ready to deliver a 32-bit word, it transmits a data ready (DR) signal. Whenever, during the presence of the DR signal, the control device receives an STR signal, it drops the DR signal and starts to load the I/O channel with a new 32-bit word.

Sixteen bits of the 32-bit word represents the number HP, indicating the desired horizontal position of the electron beam, these bits are fed, via the HP signal line cable to the horizontal deflection control (HDC). Control HDC includes a 16-bit horizontal displacement register for storing these 16 bits, and also includes a second 16-bit horizontal position register for storing the 16 bits representing the actual present position of the electron beam. A comparator therein compares the contents of the two registers. If an equality exists, it emits an HZ signal, if an equality does not exist it transmits to the cathode ray tube circuits (CTS) an HD signal of changing amplitude and of such a polarity to the cathode ray tube circuits for horizontally deflecting the electron beam in a direction to zero out the difference. As the electron beam moves in the horizontal direction, HS and HI signals from the horizontal position indicating transducer (HIT) keep updating the horizontal position register.

The remaining sixteen bits of the 32-bit word are transferred as two 8-bit number via the VSP and VEP signal cables to the vertical deflection control (VDC). Control VDC includes an 8-bit vertical start register, which stores the VSP number, an 8-bit vertical end register, which stores the VEP number, and an 8-bit vertical position register which stores a number representing the instantaneous vertical position of the electron beam. There is also a comparator therein, which compares the contents of the vertical position register and the contents of one of the other registers. If there is no equality, circuitry therein transmits to the cathode ray tube circuits (CTS) a VD signal of changing amplitude and of such a polarity to vertically deflect the electron beam in a direction to zero out the difference. As the electron beam moves in the vertical direction VS and VI signals from vertical position indicating transducer VIT continuously updates the vertical register.

In addition, the vertical deflection control (VDC) includes a control circuit for selectively switching the contents of the vertical start register and the vertical end register to the comparator. In addition, the control circuit generates: a U (Update) signal, which indicates that a new stroke defining word should be drawn from data source (DS); and a WR (Write) signal, mutually exclusive with the U signal, indicating that the record medium should be exposed to a light beam.

Optical system (OS) focusses the screen of the cathode ray tube (CRT) onto the record window (RW) of the record medium (RM) and simultaneously onto both the vertical position indicating transducer (VIT) and the horizontal position indicating transducer (HIT). For the time being, it is only necessary to know that lens L1 focusses main light beam B onto partially silvered mirror M1 which reflects a portion of beam B1 as beam B2 toward record medium (RM) and which transmits a portion of beam B1 and beam B3 to half-silvered mirror M2. Mirror M2 reflects a portion of beam B3 as beam B4 toward horizontal position indicating transducer (HIT), and transmits a portion as beam B5 to vertical position indicating transducer (VIT), via lens L6.

The operation of the pattern generator will now be described.

Data source (DS) transmits an initial CL signal, which is transmitted to the vertical deflection control (VDC) and the horizontal deflection control (HDC). In horizontal deflection control (HDC), the CL signal presets both the horizontal displacement register and the horizontal position register to the value 8192. Thus, the comparator indicates equality and the HZ signal is present. In addition, the CL signal causes the circuit generating the HD signal to generate a zero amplitude signal. In the vertical displacement control (VDC), the CL signal presets each of the vertical start registers, the vertical end register and the vertical position register to the value 128. In addition, the CL signal sets the control circuit therein to generate the U signal, and causes the circuit generating the VD signal to generate a zero amplitude signal. The electron beam is effectively centered at the origin of the coordinate system, and the horizontal and vertical position registers record this fact. It should be noted that while the electron beam may not be at the true center or even a repeatable center, but its present position for the run under consideration is assumed to be the center and all coordinates are related thereto.

Then data source (DS) loads the first 32-bit data word into its I/O channel; i.e., HP=20; VSP=130; and VEP=126. When the signals representing this data word settle down, source DS transmits the data ready signal (DR) to the transfer control (TC) (a two input AND-gate, one input of which is connected to the DR signal line, the second input to the U signal line, and the output connected to the STR signal line).

The coincidence of the DR signal and the U signal from vertical deflection control (VDC) causes the generation of the STR signal. The STR signal: fed to horizontal deflection control (HDC), gates the signals on the HP signals lines from data source (DS) into the horizontal displacement register therein; fed to the vertical deflection control (VDC), gates the signals on the VSP signal lines and the signals on the VEP signal lines into the vertical start register and the vertical end register, respectively; and fed to data source (DS) causes the "dropping" of the (DR) signal, and data source (DS) seeks the next code word.

With respect to horizontal deflection control (HDC), the comparator therein shows an inequality, i.e., the position register is storing 8192, which is greater than the value 20 stored in the horizontal displacement register. Therefore, the HZ signal terminates and the HP signal assumes a polarity and changing amplitude to deflect the electron beam, say, to the left. As the electron beam moves to the left, light beam B4 follows and moves over transducer HIT which emits an HI pulse for each increment of movement and an HS signal indicating, say, movement to the left. (Any inversions or transpositions because of the optics involved will be ignored for the sake of simplicity, since they can be readily compensated.) The HI pulses cooperating with the HS signal cause unit decrementing of the number stored in the horizontal position register. This movement and decrementing continue until the values in the two registers in the horizontal deflection control (HDC) are equal. At that time, the HZ signal is again generated and the magnitude of the HD signal "frozen." Note that if this signal drifts, the horizontal position of the electron beam will drift as will light beam B4 causing generation of further HI pulses and the HS signal which change the number in the horizontal position register forcing the magnitude of the HD signal to return to the desired value.

At the same time, by virtue of the presence of the U signal in vertical deflection control (VDC), the number 130 in the vertical start register is being compared with the number 128 in the vertical position register. An inequality exists, causing the generation of a VD signal of changing magnitude and having a polarity to, say, upward by deflecting the electron beam. At the same time, light beam B5 moves upwardly over vertical positioning indicating transducer (VIT). With each increment of such movement a VI pulse is generated while the VS signal indicates the direction of movement. The VI pulses cooperating with VS signal in the vertical deflection control (VDC) unit decrement the number stored in the vertical position register. The decrementing continues until an equality is sensed (indicated by a VZ signal internal to deflection control VDC) causing the "freezing" of the VD signal. The coincidence of the HZ signal and the VZ signal in vertical deflection control (VDC) causes the generation of the WR signal and a comparison of the contents of the vertical position register (130) and the contents of the vertical end register (126). The WR signal when received by horizontal deflection control (HDC) causes the generation of either the H1 or H2 signals which are fed to the Kerr cell shutters KS1 and KS2, respectively (each Kerr cell shutter includes a Kerr cell and its high-voltage driver). The associated shutter opens, permitting beam light B2 to impinge on the record medium (RM). (Note that only during the occurrence of the WR signal is the record medium exposed to the light beam B2 while both transducers are always exposed to light beam B3.)

Because of the direction of the inequality now sensed by the comparator in vertical deflection control (VDC) the HD signal now generated has a polarity to drive the electron beam in a downward direction. While moving downward, the VI pulses and VS signal unit increment the value in the vertical position register until it has the value 126. At that time, equality is sensed, the VZ signal is again generated and the VD signal frozen. This VZ signal causes the generation of the U signal and the termination of the WR signal which terminates the H1 or H2 signal and the closing of the open shutter. The U signal is fed to the transfer control (TC) when it cooperates with a DR signal from data source (DS) to generate an STR signal. The STR signal gates in the next 32-bit word associated with the next column segment or stroke (HP=21; VSP=124; VEP=132). Another cycle begins but this time the writing stroke is in the upward direction.

It should be noted that during the writing of the stroke, i.e., during the vertical movement of the beam during the presence of the WR signal, if pin cushion distortion occurs on the screen of the cathode ray tube, the electron beam B4 will drift over the transducer HIT. However, HI pulses and the HS signal will be generated to cause deflection control (HDC) to vary the magnitude of signal HD to zero out the drift and remove the pin cushion distortion. A similar effect also occurs for the vertical dimension.

The pattern generator includes means for extending the width of the recording window (RW) over what would be normally available. This is accomplished by virtue of the portion of the optical system (OS) to the right (as seen in FIG. 1) of mirror M1. A polarizing filter PZ intercepts the light beam B2. The beam B2 after passing through filter PZ is split by half silvered mirror M3 into beams B6 and B7. Beam B6 is deflected by mirror M4 through shutter KS1, in the form of a Kerr cell, and focused by lens L2 onto slightly more than one half of the horizontal extent of the record window (RW). Beam B7, at the same time is deflected by mirrors M5 and M6 through shutter KS2, in the form of a Kerr cell, and focused by lens L3 onto slightly more than the other half of the horizontal extent of the record window (RW).

Shutter KS1 is controlled by signal H1 and is open only when the H1 signal is present; signal H2 similarly controls shutter KS2. The H1 signal will be present only when the WR signal is present and the number stored in the horizontal displacement register is less than 8192. Signal H2 is present when the WR signal is present and the stored number is 8192 or greater. While Kerr cells and a polarizer have been shown to act as shutters, it should be realized that fast operating electro-mechanical shutters could be used.

The remaining details of the pattern generator will be described. The cathode ray tube CRT is driven by cathode ray tube circuits (CTS) which include the deflection yokes and the deflection amplifiers for driving the yokes as well as the focus coils and circuits. While a cathode ray tube has been disclosed as the source of the light beams, it should be realized that lasers and other devices can be used.

Figure 3:
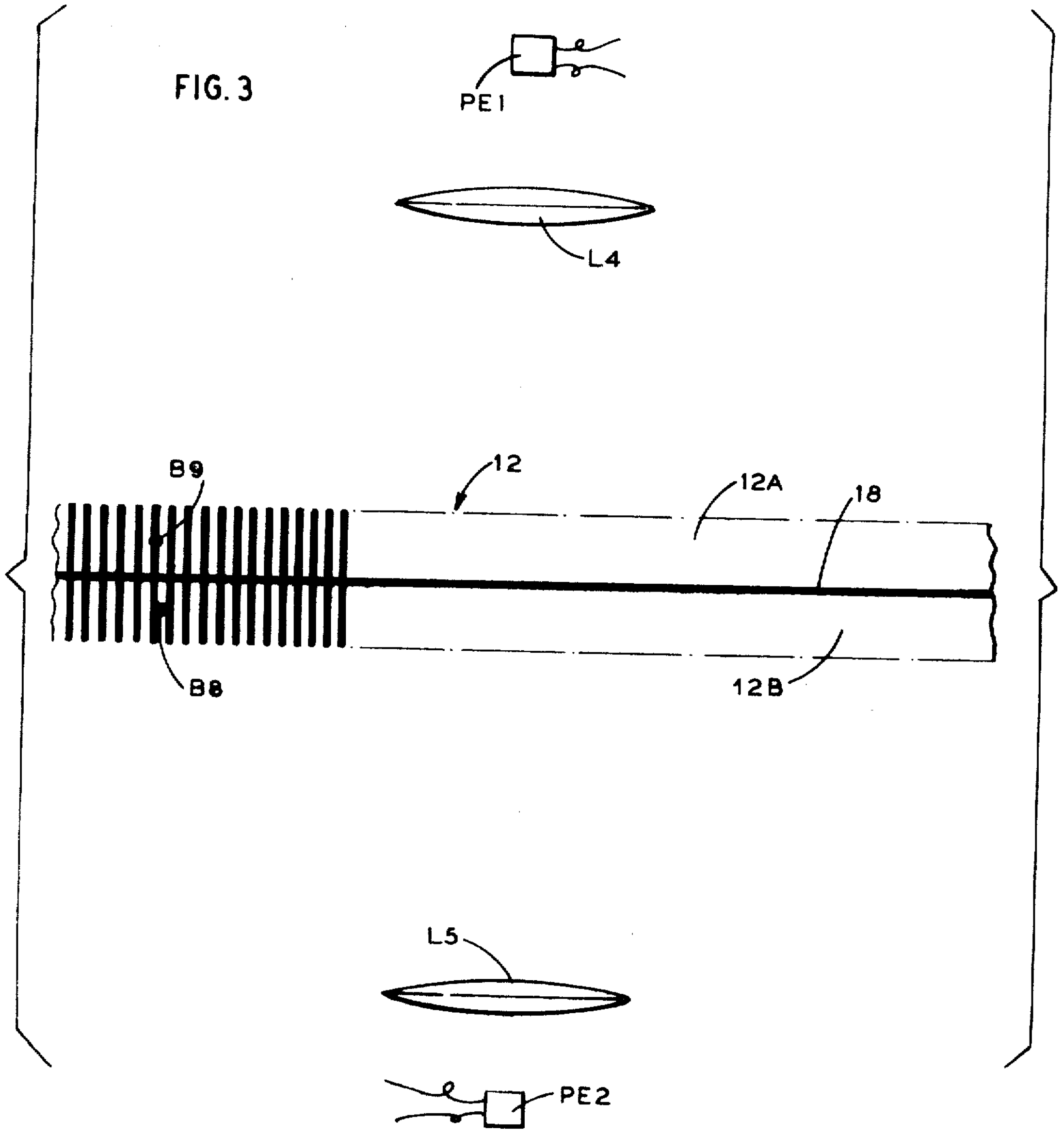
FIG. 3 shows some of the details of the transducer means used by the pattern generator.

The vertical position indicating transducer (VIT) comprises a two-compartment housing 10 with the front of the housing (comprising an optical grating 12) facing light beam B5. (See also FIG. 3.) Grating 12 comprises alternate transparent and opaque bands. The bands or rulings extend horizontally with respect to the record medium coordinate system and have a width substantially equal to the cross-section of beam B5. Each pair of bands is equivalent to one vertical coordinate interval of the record window grid. While the grating 12 extends across the face of the housing, each half opens up onto one of the compartments 14 and 16. A baffle 18 separates each compartment. Half 12A of grating 12 is focussed by lens L4 onto photosensitive transducer PE1, while half 12B is focussed by lens L5 onto transducer PE2. Now, beam B5 passes through lens L6 and is split by half silvered mirror M7 into light beams B8 and B9. Beam B8 is directed by mirror M8, and lens L7 onto portion 12B of grating 12. Beam B9 is directed by mirrors M9 and M10, and lens L8 onto portion 12A of grating 12. The need for the two beams B8 and B9 is to indicate direction of movement of beam B5. Beams B8 and B9 are laterally separated from each other and their centers are longitudinally separated by the width of one grating ruling. Thus, when beam B8 is transmitted to transducer PE2 an opaque band blocks beam B9 from reaching transducer PE1 (see FIG. 3). Therefore, as beam B5 moves to vertically transducers PE1 and PE2 alternately transmit signals to signal processing circuits 20. These circuits, which are well known to those skilled in the art of optical position encoders, generate the VI increment pulses and VS direction indicating signals. Horizontal position indicating transducer HIT is similar to vertical position indicatng transducer VIT and responds to the horzontal movement of beam B4. In this cause the rulings of its grating are vertically oriented, i.e., orthogonal to the rulings of grating 12. While the width of the rulings of the gratings has been described as equal to the cross-section of the light beam, greater resolution can be obtained by using much finer rulings and detecting the interference fringes generated by the diffractions of the light beam.

Figure 4:
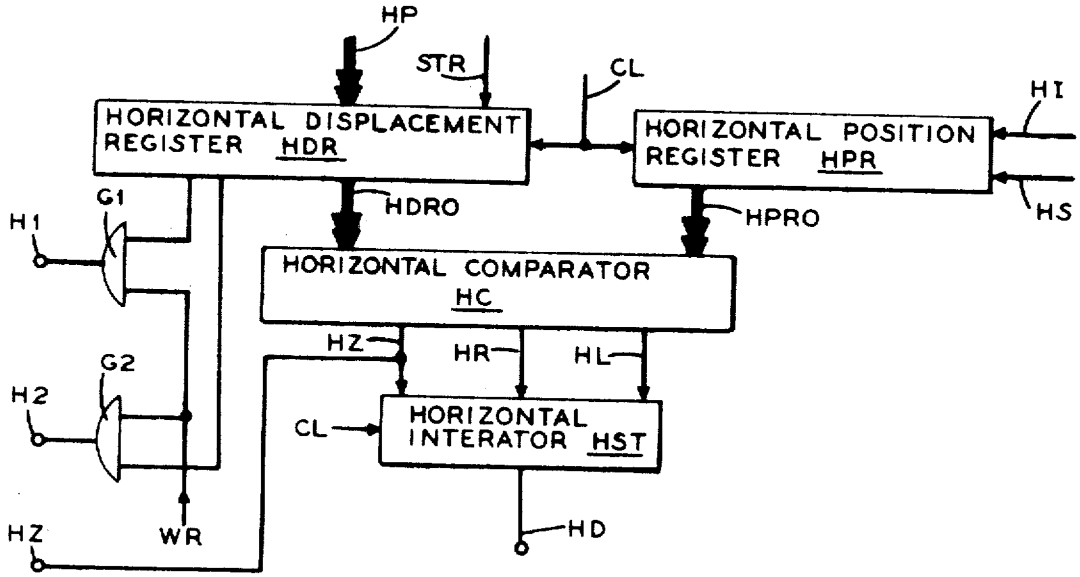
FIG. 4 shows in block diagram form the horizontal deflection control of the cathode ray tube of FIG. 1.

The horizontal deflection control (HDC) is shown in FIG. 4 comprising primarily the horizontal displacement register (HDR), the horizontal position register (HPR), the horizontal comparator (HC) and the horizontal integrator (HST).

The horizontal displacement register (HDR) can be a 16-stage flip-flop register wherein each stage receives one of the bit signals via one of the lines of the HP cable of lines. Interposed between each of the lines of the HP cable and the associated flip-flop stages is a two-input AND gate, wherein one input is connected to one of the lines of the HP cable and the output is connected to the input of the flip-flop stage. The second input of all the AND gates is connected to the STR signal line. The CL signal is fed to the appropriate flip-flop stages to preset the register to number 8192, i.e., the most significant bit stage is set to "1" and the remaining stages are set to zero.

The horizontal position register can be a 16-stage presettable up-down counter. The count input is connected to the HI signal line, while the control input which controls whether the counter acts as a unit adder or unit subtractor is connected to the HS signal line. The presettable inputs are connected to the CL signal line such that the most significant bit stage is set to "1" while the remaining stages are set to "0."

The horizontal comparator (HC) has one set of inputs connected via lines of the HPRO cable to the outputs of the stages of the horizontal position register (HPR). The comparator HC is a magnitude comparator which indicates three conditions:

(1) when the contents of register HDR is greater than the contents of register HPR, it emits the HR signal;

(2) when the contents of register HPR is greater than the contents of register HDR, it emits the HL signal; and (3) when the contents of both registers are equal, it emits the HZ signal.

The HZ, HR, and HL signals are fed to the horizontal integrator (HST) which is effectively a sawtooth waveform generator. When the HR signal is received, integrator HST starts transmitting from line HD a positive going signal whose amplitude increases with time until the HR signal terminates and the HZ signal appears. At that time, the output on the HD line is frozen at its present value. When the HL signal is received by integrator HST, the signal on line HD starts increasing in a negative direction until the HL signal terminals and the HZ signal appears. At that time, the signal on line HD is frozen at its present value. The receipt of the CL signal causes the integrator to transmit a zero amplitude signal.

Finally, each of the outputs of the most significant bit flip-flop stage of horizontal displacement register (HDR) is connected to one input of the two-input AND gates G1 and G2, respectively. The second input of each of the AND gates is connected to the WR signal line. The output of AND gate G1 is connected to the H1 signal line; and the output of AND gate G2 is connected to the H2 signal line.

Figure 5:
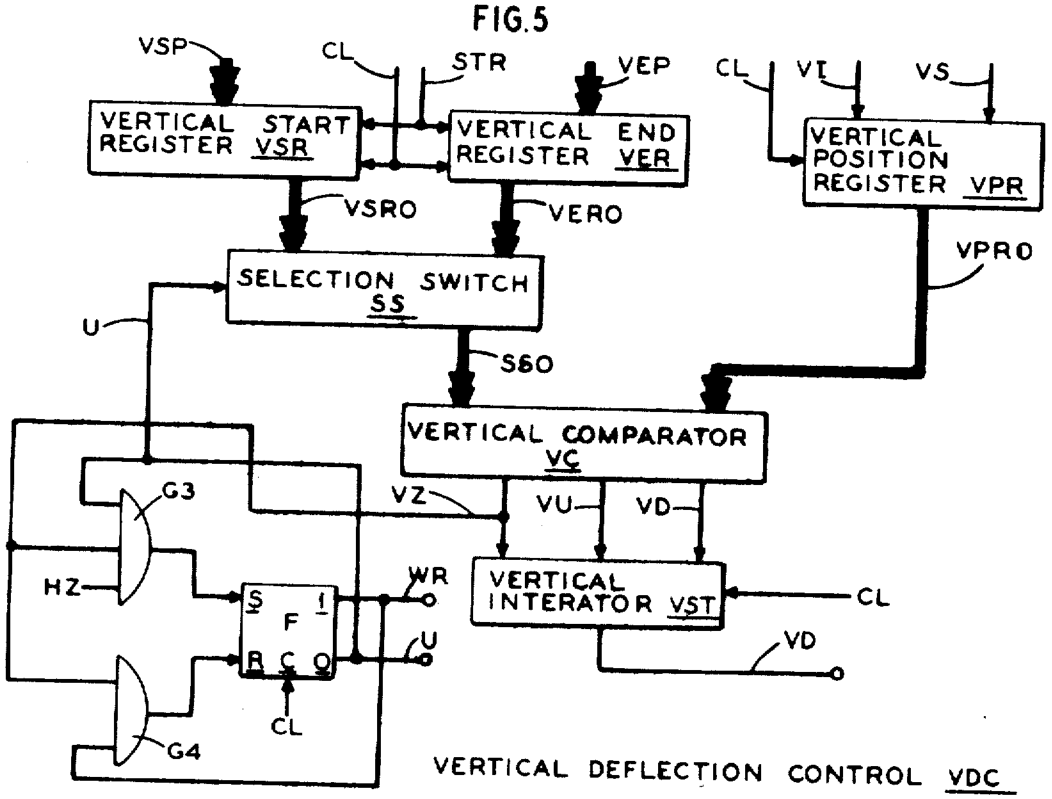
FIG. 5 shows in block diagram form the vertical deflection control of the cathode ray tube.

The vertical deflection control (VDC), shown in FIG. 5, comprises the vertical start register (VSR), vertical end register (VER), vertical position register (VPR), selection switch (SS), vertical comparator (VC), vertical integrator (VST), and a control circuit centered around flip-flop (F).

The vertical start register (VSR) and the vertical end register (VER) are similar to the horizontal displacement register (HDR) of FIG. 4, except they are 8-stage registers instead of 16-stage registers, and the inputs of the 8-stages of register VSR are connected to the signal lines of cable VSP and the inputs of the 8-stages of register VER are connected to the signal lines of cable VEP. The CL signal fed to each register sets the most significant bit stage to "1" and all remaining stages to "0."

The vertical position register (VPR) is the same as horizontal position register (HPR) of FIG. 4, except it is an 8-stage register. The VI and VS signals perform to same function as the HI and HS signals in the horizontal position register. The CL signal sets the most significant bit stage to "1" and the remaining stages to "0."

The selection switch (SS) can be a logic network, which connects either the outputs of vertical start register (VSR) (the signals on the lines of cable VSRO) or the outputs of vertical end register (VER) (signals on the lines of cable VERO) to the lines of cable SSO under control of the signal on line U.

Vertical comparator (VC) is similar to horizontal comparator HC and compares the contents of vertical position register (VPR), represented by the signals on the lines of cable VPRO with the contents of either vertical start register (VSR) or the vertical end register (VER), represented by the signals on the lines of cable SSO. If the contents of vertical position register (VPR) are greater than the number represented by the signals on the lines of cable SSO, the VU signal is generated; for the opposite case the VD signal is generated; and for equality the VZ signal is generated.

The vertical integrator (VST) is similar to horizontal integrator (HST) with the signals VZ, VU and VD performing the same functions as the HZ, HR and HL signals, respectively.

Finally, consider the control circuit centered around flip-flop (F). When the flip-flop is set by a signal received at its set input terminal (S), it transmits the WR signal from its output terminal "1," and when the flip-flop is cleared by a signal at its reset terminal (R), it transmits a U signal from its "0" output terminal. The flip-flop has an initial clear terminal (C) which forces the flip-flop to the clear state regardless of the signals at its set terminal (S). Set terminal (S) is connected to the output of three input AND gate G3, whose three inputs are connected to the VZ, HZ and U signal lines, respectively; and reset terminal (R) is connected to the output of two input AND gate G4, whose two inputs are connected to the WR and VZ signal lines, respectively. In operation, the flip-flop is initially cleared by the CL signal; therefore, the U signal is present and the WR signal is absent. When there is then a coincidence of the HZ and VZ signals, the flip-flop (F) is set and the WR signal is generated and the U signal terminates. The next VZ signal passes through AND gate G4 to again clear the flip-flop (F), terminating the WR signal and again generating the U signal.

If the pattern is to be rotated, one need only rotate knob K which will rotate vertical position indicating transducer VIT about the axis of beam B5 and the horizontal position indicating transducer HIT about the axis of beam B4.

Thus, there has been shown an improved pattern generator suitable for use in a display system or as recording device requiring high precision, the precision being obtained by use of feedback signals which control the positioning of the source beam.

Since the various elements shown in the system are made up of standard components, and standard assemblies, reference may be had to "High Speed Computing Devices," by the staff of Engineering Research Associates, Inc. (McGraw-Hill Book Company, Inc., 1950); and appropriate chapters in "Computer Handbook" (McGraw-Hill, 1962) edited by Harvey D. Huskey and Granino A. Korn, and for detailed circuitry, to the example "Principles of Transistor Circuits," edited by Richard F. Shea, published by John Wiley & Sons, Inc., New York and Chapman and Hall, Ltd., London, 1953 and 1957. In addition, other references are: For system organization and components; "Logic Design of Digital Computers," by M. Phister, Jr. (John Wiley & Sons, New York); "Arithmetic Operations in Digital Computers," by R. K. Richards (D. Van Nostrand Company, Inc., New York). For circuits and details: "Digital Computer Components and Circuits," by R. K. Richards (D. Van Nostrand Company, Inc., New York).

Especially worthwhile books for finding the components mentioned in the disclosure as "off-the-shelf" items are "Digital Small Computer Handbook," "Digital Industrial Handbook" and "Logic Handbook," "Digital Logic Handbook," 1967–68 editions copyrighted in 1967 and 1968 by the Digital Equipment Corporation of Maynard, Mass.

While only one embodiment of the invention has been shown and described in detail, it will now be obvious to those skilled in the art, many modifications and variations which do not depart from the spirit of the invention as defined in the appended claims. For example, although in the system described the position of the light beam is indicated by unit incrementing or decrementing counts in the vertical and horizontal position registers in response to pulses generated as the light beam moves over the gratings, it is equally possible to use optical position encoders wherein the position of the light beam on the encoder causes the direct generation of a coded combination of signals representing the absolute location of the light beam. In addition, although beam splitting techniques have been used to divide the source beam of light into two beams, one directed toward the record medium and the other toward the transducers, it is equally possible to use a mirror or other optical device to alternately direct the source beam toward the record medium or toward the transducers. Furthermore, while there has been taught the continuous monitoring of the actual position of the beam, it is equally possible to intermittently monitor its position whether a beam splitting technique or the alternating directing technique as described in the preceding sentence is used.

What is claimed is:

1. Apparatus for presenting a pattern to a medium comprising means for generating a source beam which can change a state of the regions of the medium upon which the beam impinges, first means for directing the source beam to move in particular directions in response to control signal, means for generating first indicia related to the directions in which the source beam is to move, transducer means for generating second indicia in response to a beam moving over regions thereof, source beam guiding means for directing a first portion of the source beam to impinge on the medium while a second portion thereof impinges on said transducer means, means for selectively directing said first portion of the source beam to first or second different regions of the medium, and indicia comparing means connected to said means for generating the first indicia and to said transducer means for comparing said first and second indicia to generate and transmit said control signals to said first means in accordance with particular relationships between said first and second indicia.

2. The apparatus of claim 1 further comprising means for intensity modulating said first portion of the source beam which can impinge on the medium.

3. The apparatus of claim 1 wherein said selectively directing means comprises means for further splitting said first portion of the source beam into at least first and second beams, means for directing said first beam to said first region of the medium, means for directing said second beam to said second region of said medium, first selectively controllable blocking means for preventing said first beam from impinging on said first region, second selectively controllable blocking means for preventing said second beam from impinging on said second region, and means for controlling the operation of said blocking means.

4. The apparatus of claim 3 further comprising means modulating said first portion of the source beam.

5. The apparatus of claim 1 further comprising means for rotating said transducer means about an axis collinear with the second portion of said source beam whereby the pattern impinging on said medium has different rotational orientation.

6. The apparatus of claim 1 wherein said source beam guiding means is a beam splitting means.

7. Apparatus for presenting a pattern to a medium having at least two distinct regions comprising beam means for changing a state of the portions of the medium upon which the beam impinges, means for controlling said beam means to move in given directions and for modulating the intensity thereof, means for splitting said beam means into at least first and second beams, means for directing said first beam to one of the regions of said medium, means for directing said second beam to the other of the regions of said medium, first selectively controllable blocking means for preventing said first beam from impinging on said one region, second selectively controllable blocking means for preventing said second beam from impinging on said other region, and means for controlling the operation of said blocking means.

8. Apparatus for recording a pattern on a photo-sensitive record medium comprising means for generating a source beam of light, means for directing said source beam of light to move in particular directions in response to control signals, means for generating first coded signals related to directions in which said source beam of light is to move, signal pulse generating transducer means for generating second coded signals related to the position of a beam of light impinging thereon, said signal pulse generating transducer means comprising a ruled optical grating means and a photosensitive transducer means responsive to light falling on said ruled optical grating means, means for splitting said source beam of light into first and second beams of light, means for directing said first beam of light to said record medium, means for directing said second beam of light to said ruled optical grating means, and coded signal comparing means for comparing said first and second coded signals to generate said control signals in accordance with particular relationships between said coded signals.

9. The apparatus of claim 8 further comprising means for intensity modulating said first beam of light.

10. The apparatus of claim 9 further comprising means for selectively directing said first beam of light onto first or second regions of said record medium.

11. The apparatus of claim 8 wherein said means for generating a source beam of light is a cathode ray tube which accelerates an electron beam to a phosphor coated screen and said means for directing said source beam of light to move in particular directions in response to control signals is the electron beam deflecting means of the cathode ray tube.

12. The apparatus of claim 8 wherein said transducer means comprises first and second ruled optical disposed to intercept portions of said second beam of light, the rulings on said first ruled optical grating being substantially orthogonal to the rulings on said second ruled optical grating.

13. The apparatus of claim 12 further comprising means for rotating said ruled gratings about an axis collinear with the optical axis of said second beam of light.

14. The apparatus of claim 12 further comprising means for selectively directing said first beam of light onto at least one of the first or second regions of said record medium.

15. The apparatus of claim 14 wherein said selectively directing means comprises means for splitting said first beam of light into first and second portions, means for directing said first portion toward said first region of said record medium means for directing said second portion toward said second region of said record medium, first controllably operable means for blocking said first portion, second controllably operable means for blocking said second portion, and means for selectively operating said first and second controllably operable means.

16. Apparatus for presenting a pattern to a record medium wherein said pattern is divisible into a plurality of laterally displaced parallel line segments comprising means for generating a beam for changing a state of the portions of the medium upon which the beam impinges, beam directing means for directing said beam to move in particular directions in response to control signals, means connected to said beam directing means for generating at least a first control signal for causing the beam to move in a first direction transverse to the direction of said line segments, a second control signal for causing the beam to move in a second direction parallel to the direction of said line segments, a third control signal for causing the beam to move in said first direction, and a fourth control signal for causing said beam to move in a third direction opposite to said second direction, and means for modulating said beam to impinge on said record medium only during the movement thereof in said second and third directions.

References Cited

UNITED STATES PATENTS

| | | | |
|---|---|---|---|
| 3,144,637 | 8/1964 | Adams et al. | 340—172.5 |
| 3,305,841 | 2/1967 | Schwartz | 340—172.5 |

RAULFE B. ZACHE, Primary Examiner

U.S. Cl. X.R.

340—324; 346—110